Nov. 4, 1969  D. STUBBS ET AL  3,476,276
MANIPULATORS

Filed Jan. 15, 1968  3 Sheets-Sheet 1

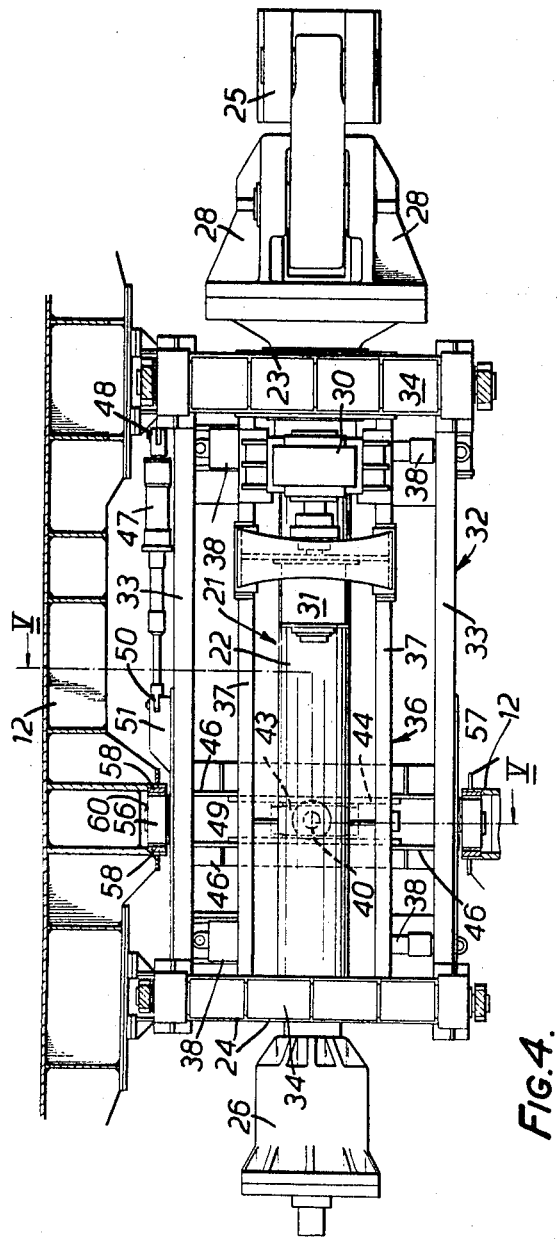
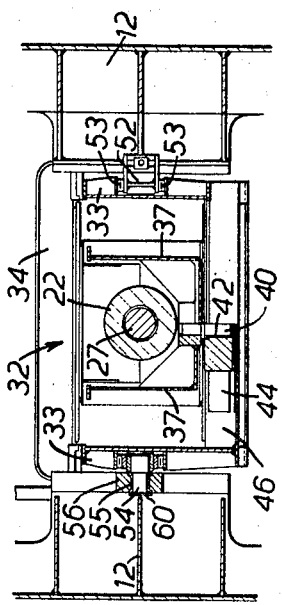
FIG. 4.
FIG. 5.

United States Patent Office 3,476,276
Patented Nov. 4, 1969

---

3,476,276
MANIPULATORS
Dennis Stubbs and William Gordon Wilson, Sheffield, and Bela Istvan Bathory, Wales, near Sheffield, England, assignors to Davy and United Engineering Company Limited, Sheffield, England
Filed Jan. 15, 1968, Ser. No. 697,772
Claims priority, application Great Britain, Jan. 16, 1967, 2,254/67
Int. Cl. B66f 9/18; B66c 3/06
U.S. Cl. 214—652                                6 Claims

ABSTRACT OF THE DISCLOSURE

A manipulator for use with a forging press comprises a manipulator carriage comprising a main frame with an intermediate frame connected to the main frame and arranged for horizontal, vertical and tilting movements about a horizontal axis, and a peel supported by the intermediate -frame for transverse movement relative thereto and/or pivotal movement about a vertical axis.

---

This invention relates to manipulators particularly for use with forging presses.

In one aspect the invention provides a manipulator comprising a carriage and a peel, with the peel mounted on the carriage so as to permit transverse horizontal movement and/or pivotal movement about a vertical axis of the peel relative to the carriage.

In a preferred form the invention provides a manipulator having a carriage comprising a main frame, an intermediate frame connected to the main frame through a linkage which permits horizontal movement, vertical movement, and tilting movement about a horizontal axis of the intermediate frame relative to the main frame, and a peel being supported by the intermediate frame so as to permit transverse horizontal movement and/or pivotal movement about a vertical axis of the peel relative to the intermediate frame.

Preferably the peel is mounted in a pair of spaced bearings for rotation about its own axis, the bearings being carried by an inner frame which is free to move transversely in the intermediate frame, and coupling means between the inner frame and the intermediate frame, the coupling means limiting relative longitudinal movement between the inner frame and the intermediate frame but allowing transverse and pivotal relative movement.

The coupling means may comprise a pin connected to the inner frame at a point intermediate the spaced bearings, the pin being rotatably carried in a coupling block slidable in a transverse guide on the intermediate frame.

Figures 1, 3:
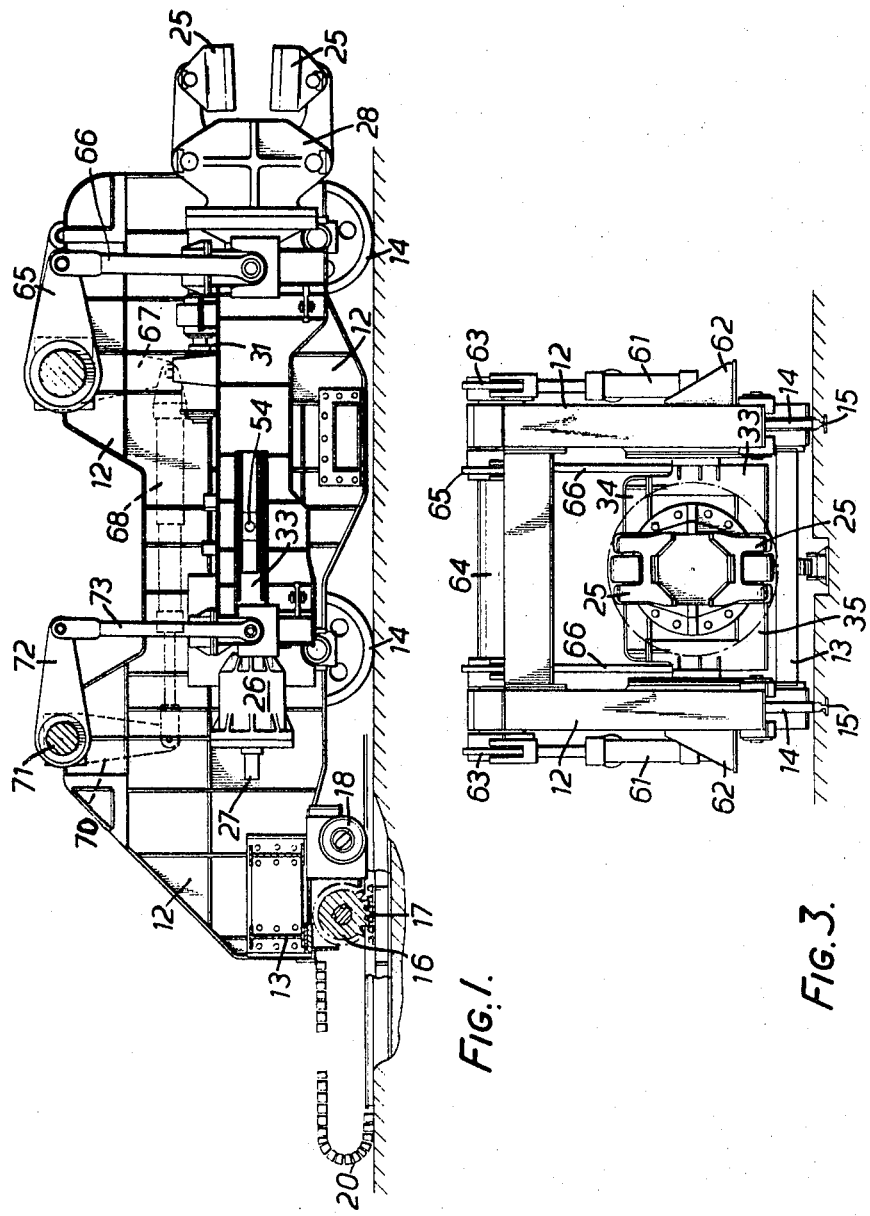
Figure 2:
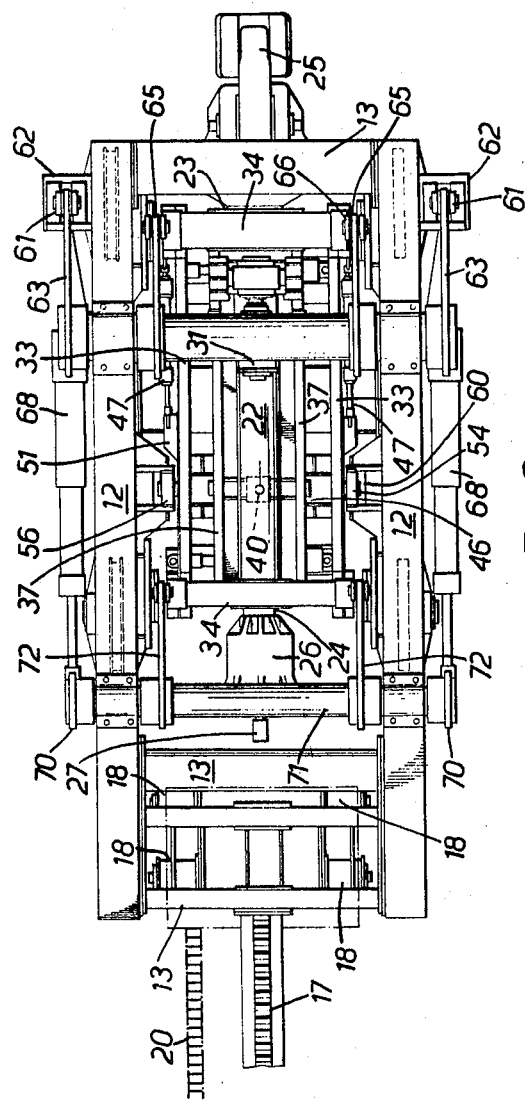

One embodiment of manipulator, in accordance with the invention will now be described, by way of example only with reference to the accompanying drawings of which:

FIGURE 1 is a sectional side view of the manipulator,
FIGURE 2 is a plan view of the manipulator,
FIGURE 3 is a front view of the manipulator with front cover removed,
FIGURE 4 is a plan view of the intermediate and inner frame and peel of the manipulator, and
FIGURE 5 is a section on the line V—V of FIGURE 4.

The manipulator comprises a main frame formed from a pair of side frames 12 connected by transverse cross pieces 13. The side frames carry flanged wheels 14 which run on rails 15. At the rear of the carriage and on the centre line thereof, a pair of sprocket wheels 16 one in front of the other (only one shown) engage with a fixed pin rack 17 parallel with rails 15. The sprocket wheels are driven by electric motors 18 supplied with electric power from a drag chain 20 to drive the carriage along the rails towards and away from a forging press.

As seen most clearly in FIGURES 2 and 4 the peel 21 has a peel shaft 22 rotably mounted in two spaced bearings 23, 24, and a pair of jaws 25 which are arranged to be opened and closed by a grip piston and cylinder assembly 26, a central rod 27 passing through the peel shaft, and a linkage mechanism 28, this mechanism being of known form and not described or shown in detail. The peel rotate mechanism 30 is also of standard form comprising a gear wheel (not shown) around the peel shaft and engageable with a further gear operable by a piston and cylinder assembly 31; this arrangement is also not illustrated or described in detail.

An intermediate frame 32 is formed from side frames 33 connected at the front and rear of the frame by upper and lower transverse cross pieces 34, 35 respectively. The frames 33 and cross pieces 34 and 35 define openings within which the bearing blocks 23, 24 are supported on wear plates so that they can slide relative to the intermediate frame in a transverse direction. The bearing blocks 23, 24 form part of an inner frame 36 formed from the bearing blocks and connecting longitudinal frames 37 on which is supported the peel rotating mechanism 30, 31. Pairs of back-to-back piston and cylinder assemblies 38 are positioned beneath the inner frame adjacent each bearing block 23, 24, and are connected between the intermediate frame and the inner frame to bias the inner frame to its central position parallel with the frame 32, while allowing the inner frame to move transversely or to pivot about a vertical axis. An intermediate part of the inner frame 36 has secured to it a downwardly projecting pin 40 which is rotatable about a vertical axis in a bush 42 in a pivot block 43. The pivot block 43 is slidable transversely on wear plates 44 in a transverse guideway formed by transverse members 46 connected to the intermediate frame. The guideway restrains longitudinal movement of the pivot block and thus restrains longitudinal movement of the inner frame relative to the intermediate frame while allowing pivotal movement of the peel about the vertical axis and transverse movement of the peel.

A pair of recoil piston and cylinder assemblies 47 are arranged outside the side frames 33 but inside the side frames 12, each piston and cylinder assembly having its forward end pivotally connected to the intermediate frame at 48 and having its rear end pivotally connected at 50 to a connecting piece 51. Each connecting piece 51 comprises a bracket portion 52 having upper and lower surfaces arranged to slide on wear plates 53 in a longitudinal slideway on the outside of its respective frame 33. The rear end of each connecting piece 51 carries an outwardly projecting horizontal pin 54 rotatable in a bush 55 mounted in a thrust block 56 slidable vertically in a vertical guideway formed by wear plates 58 on the inside of the side frames 12. A retaining plate 60 acts against the end of the pin 54. This arrangement guides the intermediate frame in the main frame for vertical, axial or tilting movements of the intermediate frame relative to the main frame.

At each side of the manipulator at the front end thereof an upstanding hoist piston and cylinder assembly 61 (see FIGURES 2 and 3) has its lower end pivotally connected to a bracket 62 on the outside of the frame 12. The upper ends of the piston and cylinder assemblies 61 are pivotally connected to levers 63 rigidly secured to opposite ends of a transverse rotatable bar 64 extending across the top of the carriage. Further levers 65 rigid with the bar 64 and positioned on the inside of the main frame project forwardly from the bar 64 at each side of the carriage and have their ends pivotally connected with upstanding links 66 which in turn have their lower ends pivotally secured to the intermediate frame. A further pair of levers 67 positioned outside of the main frame (see FIGURE 1) have their upper ends secured to the bar 64 and their lower ends pivotally connected to the forward ends of a pair of substantially horizontal tilt piston and cylinder assemblies 68. The other ends of the tilt piston and cylinder assemblies are connected to the lower ends of a further pair of levers 70 at the rear of the carriage and secured to opposite sides of a further transverse bar 71 extending across the carriage. Levers 72 corresponding to the levers 65 are also secured to the bar 71 and their forward ends are pivotally connected with links 73 corresponding to the links 66 and having their lower ends pivotally secured to the intermediate frame. With the tilt cylinder assemblies 68 at a predetermined constant length, the levers and links 65, 66, 67, tilt piston and cylinder assemblies 68, and levers and links 70, 72 and 73 form a parallel linkage system such that movement of the hoist piston and cylinder assemblies 61 causes the intermediate frame and thus the peel to be raised or lowered in a parallel manner. Operation of the tilt piston and cylinder assemblies with the hoist cylinders fixed causes the rear end of the intermediate frame to be raised and lowered relative to the front end and thus the peel to tilt. Operation of the recoil piston and cylinder assemblies moves the intermediate frame and thus the peel horizontally and longitudinally relative to the main frame, thus allowing the carriage to move forward while the peel remains stationary during a forging stroke and restoring the peel to its datum position on the carriage during the peel free time of the forge.

It will be seen that the peel has facility to move vertically in a parallel manner, to tilt about a horizontal axis, to move transversely, to pivot about a vertical axis, to move longitudinally relative to the main frame and to rotate about its own axis.

We claim:
1. A manipulator comprising
   a peel and
   a carriage, said carriage comprising
   an inner frame supporting said peel,
   an intermediate frame,
   means supporting said inner frame in said intermediate frame so as to permit horizontal movement of said inner frame relative to the intermediate frame in the direction transverse to the longitudinal axis of the peel,
   means for moving said inner frame relative to the intermediate frame,
   a main frame,
   a plurality of links supporting said intermediate frame in said main frame so as to permit movement of the intermediate frame relative to the main frame in the direction parallel to the longitudinal axis of the peel and
   means for moving said intermediate frame relative to the main frame.
2. A manipulator comprising
   a peel and
   a carriage, said carriage comprising
   an inner frame carrying spaced apart bearings receiving said peel so as to permit rotation of the peel about its longitudinal axis,
   an intermediate frame,
   means supporting said inner frame in said intermediate frame and preventing movement of the inner frame relative to the intermediate frame in the direction parallel to the longitudinal axis of the peel but allowing the inner frame both transverse movement and pivotal movement about a vertical axis relative to the intermediate frame,
   means for moving the inner frame transverse to, and for pivoting the inner frame about a vertical axis, relative to the intermediate frame,
   a main frame,
   a plurality of pivotal links at opposite ends of said intermediate frame for supporting said intermediate frame from said main frame and permitting movement of the intermediate frame relative to the main frame in the direction parallel to the longitudinal axis of the peel and vertical movement and tilting movement about a horizontal axis of the intermediate frame relative to the main frame,
   means for displacing said links whereby said intermediate frame is moved relative to said main frame,
   wheels supporting said main frame and
   means for displacing said carriage on said wheels in the direction parallel to the longitudinal axis of the peel.
3. A manipulator as claimed in claim 1 in which said means for moving the inner frame comprise a pair of hydraulic devices positioned one at each of the opposite ends of the inner frame, and each comprising a pair of hydraulic piston and cylinder assemblies connected back to back and acting between the inner frame and opposite sides of the intermediate frame.
4. A manipulator as claimed in claim 1 in which said links are pivotally secured to said intermediate frame and to levers carried by said main frame, and said means for moving said intermediate frame comprises a pair of piston and cylinder assemblies which when actuated cause said levers to be rotated and said links to be raised or lowered.
5. A manipulator as claimed in claim 4 wherein some of said levers are rotatable by means of a further pair of piston and cylinder assemblies and wherein operation of the further pair of piston and cylinder assemblies at a time of non-operation of said other piston and cylinder assemblies causes one end of the intermediate frame to be raised or lowered relative to the other end thereby tilting the peel about a horizontal axis.
6. A manipulator as claimed in claim 2 in which said means supporting said inner frame include a pin mounted on the inner frame and rotatable about a vertical axis in a pivot block supported by the intermediate frame and slidable in a transverse guideway provided thereby.

References Cited

UNITED STATES PATENTS

| 2,741,374 | 4/1956 | Morgan. | |
| 2,812,090 | 11/1957 | Westling | 214—652 |
| 3,198,366 | 8/1965 | Figenshau | 214—652 |

FOREIGN PATENTS

| 1,392,213 | 2/1965 | France. |

GERALD M. FORLENZA, Primary Examiner

G. F. ABRAHAM, Assistant Examiner

U.S. Cl. X.R.

214—147